May 5, 1959     J. J. BRYANT     2,884,656
ROTARY WIPER
Filed March 14, 1955     3 Sheets-Sheet 1
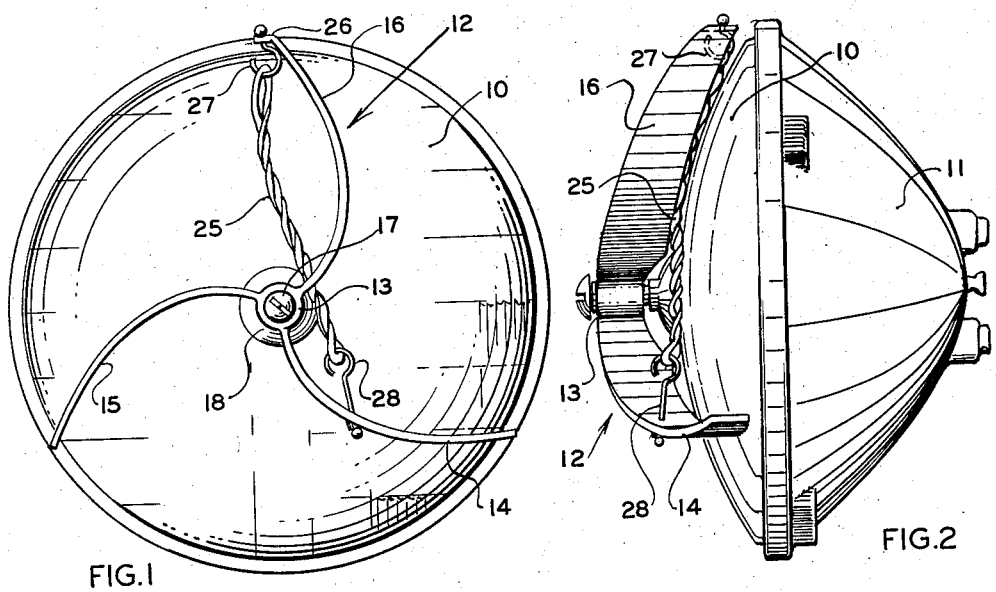
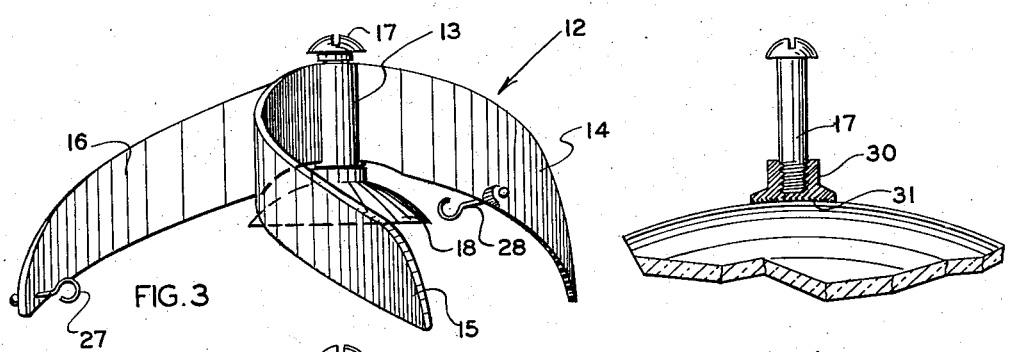
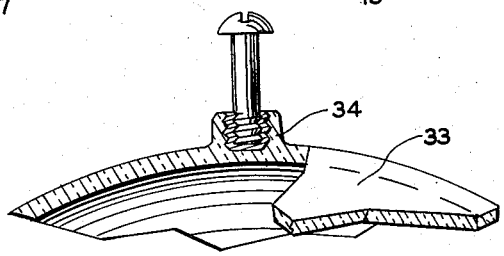
INVENTOR.
JOHN J. BRYANT
BY
ATTORNEYS May 5, 1959

J. J. BRYANT 2,884,656

ROTARY WIPER

Filed March 14, 1955

INVENTOR.
JOHN J. BRYANT

BY
Cullen & Cantor

ATTORNEYS

May 5, 1959  J. J. BRYANT  2,884,656
ROTARY WIPER

Filed March 14, 1955  3 Sheets-Sheet 3

INVENTOR.
JOHN J. BRYANT
BY
*Cullen J Cantor*
ATTORNEYS

United States Patent Office 2,884,656
Patented May 5, 1959

2,884,656

ROTARY WIPER

John J. Bryant, Detroit, Mich.

Application March 14, 1955, Serial No. 493,848

12 Claims. (Cl. 15—250)

This invention relates to a rotary wiper and more particularly to an air current operated wiper suited for cleaning and wiping the front glass of an automobile headlight and the like.

In all modern automotive vehicles, wipers are provided as standard equipment to clean the front windshield of the vehicle and sometimes wipers are provided to clean the rear window in automobiles. However, until this time, no fully satisfactory means has been provided for cleaning the glass of the automobile vehicle headlights while the vehicle is in motion. It is well known that during rainy, snowy, or slushy weather, the front glasses of the headlights become coated with moisture and dirt which reduces the amount of light passing through the lens from the headlight.

One of the major problems in providing a wiper for automobile headlights is that it is difficult to fit a wiper element upon the spherical shaped lens and second, that it is very difficult to provide some sort of power means at the front end of the car which fit in with the vehicle body sheet metal work and will still propel some sort of wiper.

Accordingly, it is an object of my invention to provide a wiper element which will clean the headlights substantially continuously during the operation of an automobile and which will operate without external power connections.

In order to accomplish my objectives, I provide a rotor which is adapted to be attached to the vehicle proximate a headlight or some other such surface to be cleaned and which obtains its motive power by means of the air current passing over the headlight or other surface to be wiped. Because the headlight lens is spherically curved, I provide a thin, elongated, flexible, resilient wiper element secured to the rotor which element rotates across the surface of a lens and at the same time vibrates against and slaps and drags over the glass surface so as to loosen and throw off any dirt particles which normally would stick to the glass.

A further object of my invention is to provide an inexpensive wiper which includes a rotor which may be secured to a headlight or other such surface with a minimum of effort and expense and which is so constructed as to take full advantage of the air currents flowing over the surface to be cleaned so that no additional motive power is required to operate the wiper. In addition, this wiper is adapted to operate substantially continuously, so as not only to remove moisture and the like from the glass surface to be cleaned but also to continuously remove dirt, dust, grime, etc. from such surface.

These and other objects of my invention will become apparent upon reading the following description of which the attached drawings form a part.

Referring to the drawings in which:

Fig. 1 is a front view of the wiper attached to a headlight lens or front glass.

Fig. 2 is a side view of Fig. 1.

Fig. 3 illustrates the wiper rotor per se.

Fig. 4 illustrates the supporting shaft for the rotor and means for securing this shaft to a glass light structure.

Fig. 5 is similar to Fig. 4 but illustrates a second means for connecting the shaft to an automobile headlight lens.

Figure 9:
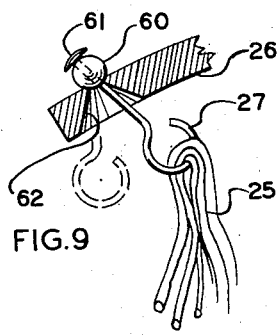
Figures 10, 11:
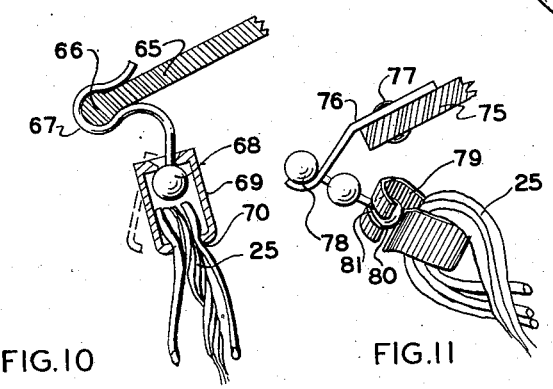

Figs. 9–11 each illustrates a different form of hook means for connecting the wiper element to the rotor.

Figure 12:
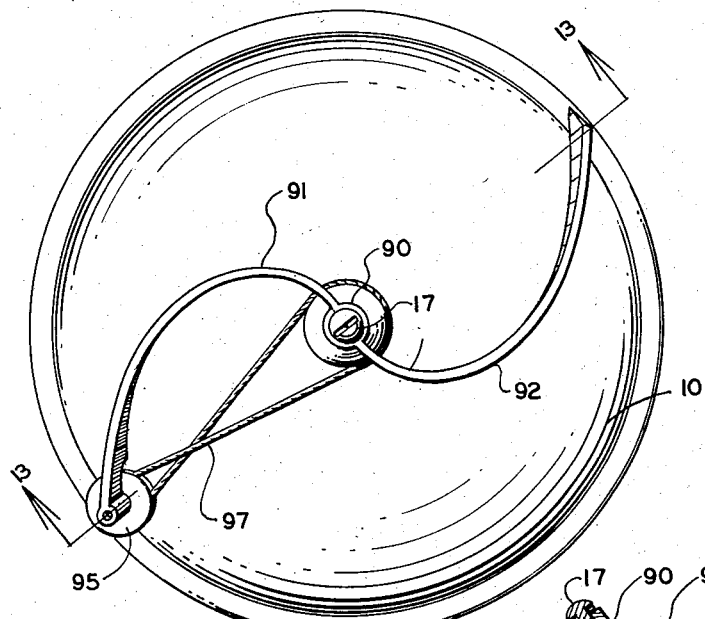

Fig. 12 is a front view of a fourth modification, and

Figure 13:
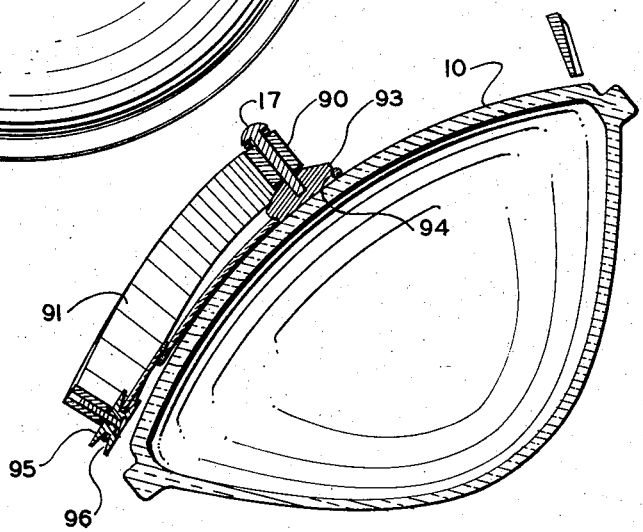

Fig. 13 is a cross-sectional view taken on line 13—13 of Fig. 12.

During the operation of an automotive vehicle, air currents strike and pass over the surface of the glass front or lens of the front headlights. This air current is utilized to operate the rotor element of my wiper as will now be described. Thus, referring to the exemplary arrangement shown in Figs. 1 to 3, a glass front 10 of an automobile headlight 11 is shown having a rotor generally designated as 12 fastened to the central portion of the glass. This rotor 12 consists of a central hub 13 which is centrally bored and to which vanes 14, 15 and 16 are joined. As can be seen in Figs. 1 and 3, these vanes are curved in such a way as to catch and take full advantage of the air currents passing over the surface of the headlights glass.

The rotor may be supported for rotation upon, for example, a shaft or headed bolt 17 which in turn is secured to a rubber suction cup 18. This suction cup is pressed against the surface of the glass and will remain in position thereon. The centrally apertured hub 13 fits over the shaft 17 and is retained thereon by means of the bolt head or by means of a cotter pin where a shaft having no head is used.

As can be seen, the rotor is positioned so that the vanes are close to, but out of contact with the surface of the glass headlight.

It is desirable to curve the vanes relative to the glass front so that the vanes are more or less uniformly spaced from the glass during the entire length thereof. Note that the glass headlight front is usually formed in a spherical shape so that it would thus be necessary to likewise bend or cut or curve the vane to correspond with this shape along the length of each vane.

In order to clean the surface of the glass headlight, a wiper element 25 is provided. This wiper element may comprise one or more ordinary rubber bands such as are commercially available or may consist of a plastic material such as nylon or other type of plastic which is elongated and which possesses the requisite qualities such as flexibility, resiliency, stretchability, and so forth. The wiper may also be coated with a cloth fabric to absorb moisture in the same way as does a wick.

The wiper element 25 is exemplarily shown to be stretched between the vane 14 near the hub 13 and the end 26 of one of the vanes such as 16. In order to secure the rubber band in position, the vane end 26 is provided with a hook 27, and a second hook 28 is provided on vane 14 as seen in Fig. 1.

In the structure above described, the air currents passing against the surface of the headlight are diverted radially upon striking the headlight glass and then catch the vanes 14, 15 and 16 to cause the rotor to rotate. Rotation of the rotor causes the wiper element 25 to drag over the surface of the glass. This dragging effect is accomplished by means of having the hooks 27 and 28 sufficiently close to the surface of the glass 10 so as to cause the rubber band or wiper element to remain in substantial contact with a large area of the headlight glass.

The rotor will operate at all times that the automobile moves at a sufficient speed. It has been found in one model constructed that this device may be arranged so as to operate at any speed of the vhicle above 10 miles an hour. However, the speed of operation is not critical, and it can be seen that the major resistance to rotation is caused by the contact between the wiper element and the headlight glass and that as the friction between the wiper is increased, more wind or air current force is required to rotate the wiper vanes, and vice versa.

When the wiper element wears out, it can be simply replaced by removal from the hooks and another rubber band or another similar type band such as described above can be substituted therefor.

Referring to Fig. 4, it is also contemplated that rather than using a suction cup to fasten the rotor to the glass front of the headlight, a pad element 30 having a lower surface 31 shaped to conform with the central portion of the surface to be wiped may be glued or otherwise adhered to the surface by a suitable adhesive. The shaft 17 which may be threaded at the lower end thereof is connected to the pad and the device in all other respects would be similar to that described in connection with Figs. 1 to 3. In this case however, because of the adhesive securement, the rotor will not be removable under ordinary circumstances from the glass headlight whereas in the modification of Fig. 1 the suction cup may be easily pulled away from the glass headlight and the device may be installed if desired, only during those times of the year or only during that type of weather in which it is specifically desirable to clean the headlight.

Referring next to Fig. 5, I provide here a means for fastening the shaft 17 to the headlight glass surface which means consists of a large lens having an internal shape corresponding to the external shape of the glass headlight. Thus, this lens 33 may be fitted closely over the surface of the glass headlights and may be secured thereto by adhesive or some other suitable means such as clips along the side of the headlight. A threaded boss 34 to hold the shaft 17 is provided. Thus, in this modification we effectively have two lenses, one the ordinary glass surface of the headlight and secondly, the outer glass or plastic lens 35 which fits over the ordinary headlight. Similarly, the basic headlight glass 10 may be provided with a threaded boss 34 and the outer lens 33 may be omitted.

Figure 6:
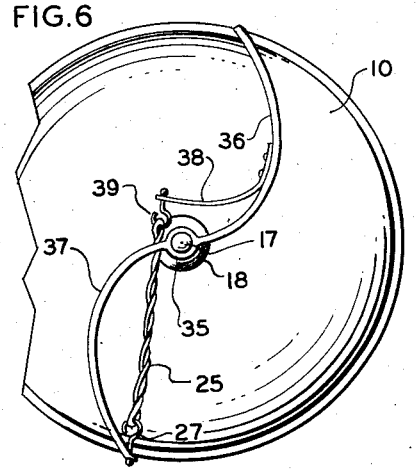
Fig. 6 is a front view of a modified form of rotor.

Referring next to Fig. 6, wherein I show a rotor having two vanes 36 and 37 joined to a hub 35. In this case, the wiper element 25 is joined to a hook 27 similar to that shown in Fig. 1 above. However, the opposite end of the wiper is connected to a hook 39 mounted upon a resilient arm 38 which is connected to one of the vanes 36 and which lies adjacent the hub 35. Because of the resilient arm 38, the resiliency of the wiper element 25 coupled with the resiliency of the arm 38 causes the wiper to vibrate, jump and slap against the surface of the glass 10 to a high degree thereby loosening any dirt or grime which would ordinarily be difficult to remove.

Figure 7:
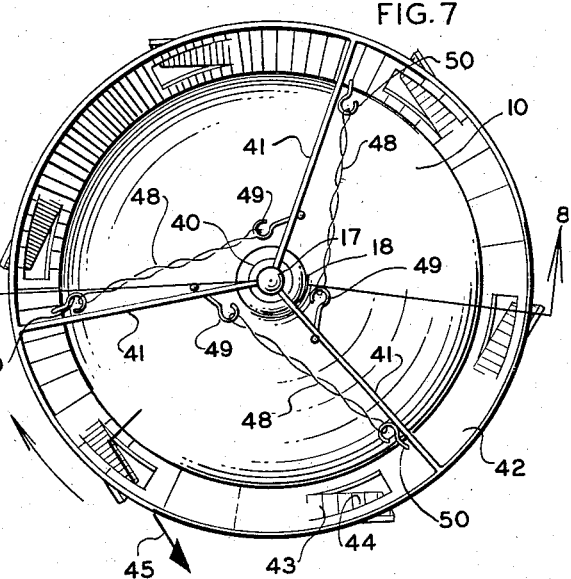
Fig. 7 illustrates the front view of a third modification.
Figure 8:
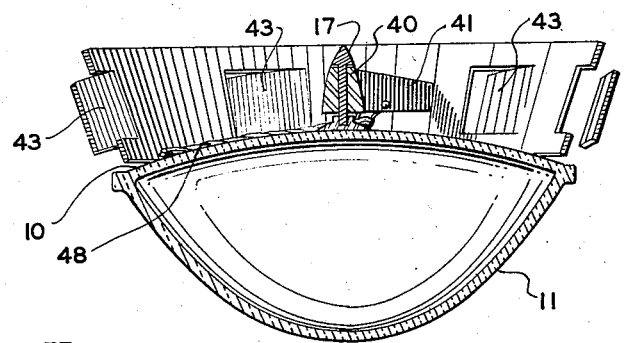
Fig. 8 is a cross-sectional view taken on line 8—8 of Fig. 7.

In Figs. 7 and 8 I show a different modification for the rotor construction. The shaft 17 and the suction cup 18 are similar to that shown in Figs. 1 and 2. However, the hub 40 is provided with three or more outwardly extending vanes 41 which are joined at their outer ends by an annular ring 42. The annular ring as seen in cross section in Fig. 8 is of greater height than width and is provided along the sides thereof with air scoops 43 formed by striking out portions of the ring to form openings 44. Thus the normal path of air current as seen in Fig. 7 would be around the headlight lens into the opening 44 and finally out thru the scoop 43. This is demonstrated by arrow 45 in Fig. 7. Because of this construction, air currents which pass through the scoop from the inside of the annular ring, and away from the annular ring from the outside thereof cause the annular ring to move in the opposite direction of the air current flow through the scoop.

In this case, one or more wiper elements 48 may be provided and these wiper elements may be connected directly to hooks or the like 49 upon the bushing 40 or, as shown, upon vanes 41, and upon similar type hooks 50 or the like upon the annular ring directly beneath or adjacent, if desirable, the end of each one of the vanes 41.

In this construction, it can be seen that the rotor in addition to being propelled by the air passing through scoops 43, is likewise propelled by the vanes 41. Therefore, a great deal of propulsion area is provided so that despite the relatively large drag of the three wiper elements, the combined efforts of the vanes and the scoops rotate the rotor in order to accomplish the cleaning function.

Figs. 9 to 11 illustrate different types of hook members that may be used in the foregoing type of headlight wipers. Thus, in Fig. 9, the hook 27 is provided at its free end with a ball 60 slid over the end of the hook and retained thereon by a head 61. The end of the hook is inserted through a funnel shaped opening 62 in the vane end 26. The complete construction of the vane and the relationship of the hook with the rotor structure is shown in Fig. 1. Because of the funnel shaped opening 62, and the ball 60, the hook is free to rotate or oscillate relative to the vane end 26 and therefore increases the freedom of movement of the wiper element 25 in vibrating against the headlight glass 10. This type structure may also be used where the hook is indicated at 28 in Fig. 1.

In Fig. 10, the modified hook shown is suitable only for connection to the end of one of the vanes. Thus, the vane end 65 is provided with an enlarged portion 66 over which a clip 67 is frictionally forced which clip terminates in a ball 68 fitted within a socket 69. The wiper element is gripped within the socket 69 by means of clamping jaws 70.

In Fig. 11, the wiper element end 75 is provided with a plate 76 secured thereto by means of a rivet 77 or the like, and to this plate a ball type chain 78 is secured. The end ball 80 of this chain is grasped by a hook 79 having an opening 81 fitted over the ball and across the chain member. This hook 79 grasps the ends of the wiper 25.

Lastly, I illustrate a fourth rotor modification in Figs. 12 and 13 as follows:

Hub 90 is rotatably mounted upon a shaft 17 secured to the headlight glass 10 in the same manner as illustrated in the foregoing modification. In this case, however, two vanes 91 and 92 are joined to the hub and extend radially therefrom. Beneath the hub and serving as a means to secure the shaft 17 to the headlight 10 is a pad 93 having a channeled portion arranged around its entire lower periphery 94. Upon the end of one of the vanes 91 is rotatably mounted a pulley 95 having a channel 96 peripherially around the same. Here, the wiper 97 is passed around the pulley and around the channel 94 of the pad 93. Thus, rotation of the rotor causes the wiper 97 to drag upon the glass surface 10 and thereby, because of the rotatable pulley 95, causing the wiper 97 to rotate relative to the pad 93. This additional rotation is particularly useful in removing tenacious grime and dirt which is caked upon the glass surface 10. It is desirable here that the wiper 97 be of some cloth covered resilient material so as to absorb moisture to some degree.

This invention may be further developed within the scope of the claims without departing from the essential features thereof. Accordingly, it is desired that the foregoing description be read as being merely illustrative of several operative embodiments and not in a limiting sense.

What is claimed is:

1. An automobile headlight wiper for removing dirt from the headlight comprising a shaft, means to secure the shaft normal to the center of an automobile headlight glass, a rotor having a hub fitted over said shaft for rotation thereon and vanes joined to the hub and extending radially therefrom, a resilient, thin, vibratile element engageable with the glass surface and means including said rotor for supporting said element so that a portion of said element is engageable with said glass, said portion rolling about its own axis a plurality of revolutions relative to said rotor during rotation of said rotor relative to the glass.

2. A rotary wiper comprising a rotor having a hub and vanes connected to said hub extending radially outward from said hub, means for rotatably mounting said hub relative to a surface which is to be cleaned of dirt; a thin, resilient, elongated, vibratile element having a portion adapted to contact the surface to be wiped, means supporting one end of said element proximate said hub, and means for supporting the other end of said element upon said rotor at a point remote from said hub, said vibratile element portion repetitively and intermittently engaging and slapping against the surface which is to be cleaned of dirt during rotation of said rotor relative to the surface.

3. A rotary wiper comprising a rotor having a bored hub rotatably fitted over a shaft, means to fasten said shaft normal to a surface to be cleaned of dirt, vanes connected at one end to said hub and extending radially from said hub; first rotatable connection means supported adjacent the extended end of one of said vanes and rotatable relative to said vanes, second rotatable connection means supported adjacent said hub and rotatable relative to said hub, and an elongated, thin, resilient member supported by both of said rotatable connection means, said resilient member being positioned so as to contact the surface to be wiped while rotating with and with respect to said rotor.

4. A rotary wiper as defined in claim 3, with said first connection means comprising a hook member movably connected at the end of one of said vanes to receive and to hold the end of said resilient member.

5. A rotary wiper comprising a rotor having a bored hub fitted over a shaft connected normal to a surface to be wiped, curved wind catching vanes joined to said hub and positioned so as to avoid contact with the surface to be wiped, a resilient arm joined to one of said vanes, a hook connected to the free end of one of said vanes, and a resilient wiper stretched between said hook and said arm, said arm and said hook each being so positioned as to cause said wiper to make contact with a substantial portion of the surface to be wiped.

6. A headlight wiper comprising a hub adapted to be rotatably mounted upon a pad adapted to be secured to a surface to be wiped, vanes joined to said hub and extending radially therefrom, a rotatable pulley mounted upon the end of one of said vanes, said pulley being annularly grooved, a groove formed around the periphery of said pad, and a wiper element comprising an endless loop secured over the grooves in said pad and in said pulley whereby said wiper element may rotate relative to said pad as the hub and vanes are rotated.

7. In an air-driven cleaning element for removing dirt from a light-pervious surface exposed to air currents, a member rotatably mounted in proximity to the light-pervious surface and rotatable by air currents, and a flexible, vibratile filament supported only at its ends upon said member, both of said ends being spaced from said surface, the portion of said filament between said ends being engageable with the surface, said portion rolling and twisting during rotation of said member.

8. In an air-driven wiper for removing dirt from a light-pervious surface exposed to air currents, a member rotatably mounted in proximity to the light-pervious surface and rotatable by air currents, a flexible, vibratile filament, support means for rotatably supporting said filament on said member and for rotation relative to said member, said filament rotating through a plurality of full revolutions relative to said member during the rotation of said member.

9. In an air-driven wiper for removing dirt from a surface exposed to air currents, a member, means for rotatably supporting said member proximate the surface, means responsive to air currents for imparting rotational motion to said member, a light, flexible filament having a portion engageable with the surface to be cleaned, and means including said member for supporting said filament, said flexible portion repetitively and intermittently engaging and slapping against the surface during rotation of said member.

10. In an air-driven wiper for removing dirt from a surface exposed to air currents, a plurality of vanes, means for rotatably supporting said vanes proximate the surface to be cleaned, and a thin vibratile element supported by said vanes and engageable with the surface, said element repetitively and intermittently engaging and slapping against the surface during rotation of said vanes.

11. An automobile headlight wiper for removing dirt from the headlight comprising a rotatable hub member supportable upon the headlight, a plurality of vane members joined to said hub member and extending generally radially therefrom, a resilient, elongated, vibratile wiper in the form of an endless loop, and support means supported by said vanes remote from said hub member, said endless loop extending around said hub member and around said support means and having a portion engageable with the headlight.

12. In a wiper for removing dirt from a light-pervious surface, a thin vibratile cleaning element engageable with the surface, rotatable means rotatable relative to the surface for supporting said element, and means including said rotatable means for rotating said element relative to said surface and for causing said element to repetitively and intermittently engage and slap the surface during said rotation.

References Cited in the file of this patent

UNITED STATES PATENTS

| | | |
|---|---|---|
| 2,288,429 | Baughn | June 30, 1942 |
| 2,593,073 | Trevaskis | Apr. 15, 1952 |
| 2,607,066 | Morton | Aug. 19, 1952 |